(12) United States Patent
Fischer et al.

(10) Patent No.: US 8,345,311 B2
(45) Date of Patent: Jan. 1, 2013

(54) REDUCTION OF HARMONIC ARTIFACTS IN HALFTONE SCREENS

(75) Inventors: Mani Fischer, Haifa (IL); Doron Shaked, Haifa (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 2776 days.

(21) Appl. No.: 10/844,993

(22) Filed: May 13, 2004

(65) Prior Publication Data
US 2005/0254096 A1    Nov. 17, 2005

(51) Int. Cl.
*H04N 1/405*    (2006.01)
*H04N 1/409*    (2006.01)

(52) U.S. Cl. ........ 358/3.17; 358/3.26; 358/3.2; 358/1.9; 382/280

(58) Field of Classification Search .......... 358/3.17, 358/3.26, 3.2, 1.9; 382/280
See application file for complete search history.

(56) References Cited

U.S. PATENT DOCUMENTS

| | | | |
|---|---|---|---|
| 5,673,121 A |   | 9/1997 | Wang |
| 5,726,772 A | * | 3/1998 | Parker et al. ............... 358/3.19 |
| 6,474,766 B1 | * | 11/2002 | Cooper ......................... 347/15 |
| 6,522,425 B2 | * | 2/2003 | Yoshidome .................. 358/1.9 |
| 2003/0112321 A1 |   | 6/2003 | Pierson |

FOREIGN PATENT DOCUMENTS

| | | |
|---|---|---|
| EP | 0907282 A2 | 4/1999 |
| EP | 1051024 A2 | 11/2000 |
| EP | 1571826 A2 | 9/2005 |
| EP | 1267564 B1 | 3/2008 |

OTHER PUBLICATIONS

European Patent Office, Search Report for European Appl. No. 05252935.1, dated Feb. 13, 2007, 3 pages.

* cited by examiner

*Primary Examiner* — David K Moore
*Assistant Examiner* — Quang N Vo

(57) ABSTRACT

A halftone screen is modified to reduce harmonic artifacts. Artifacts are modeled from the screen in a frequency domain. Threshold values in the screen are modified to reduce amplitude of at least some of the modeled artifacts.

53 Claims, 6 Drawing Sheets

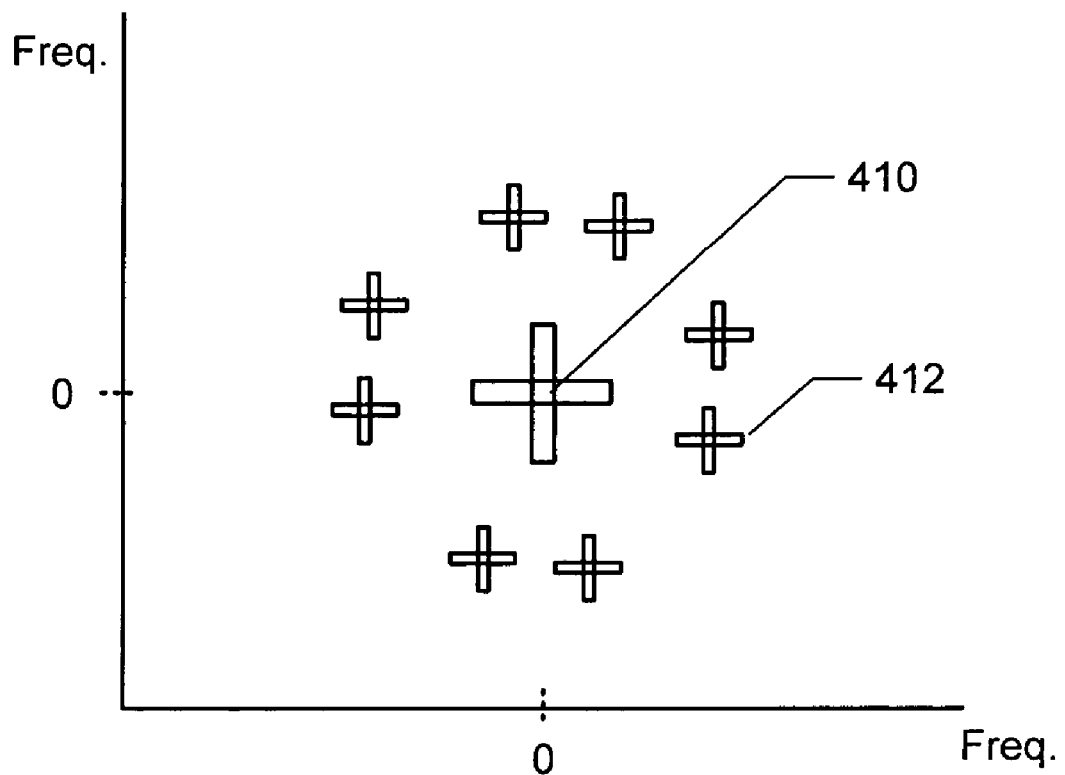

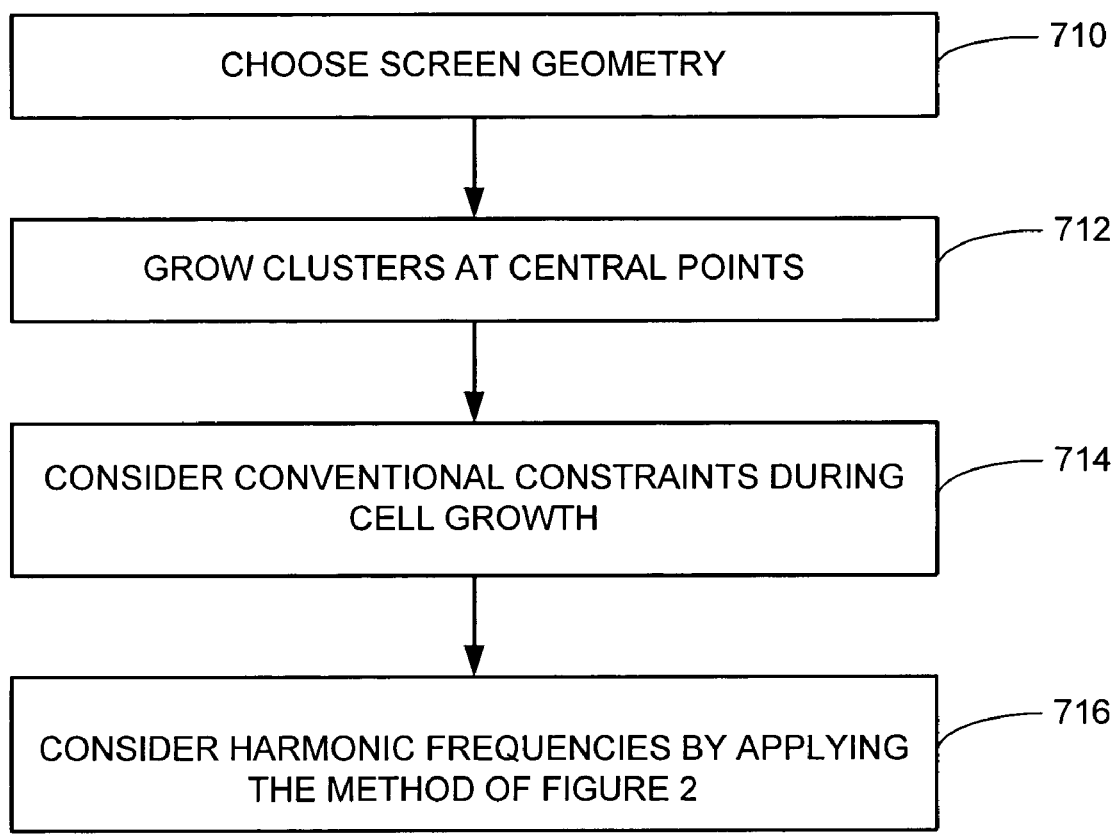

REDUCTION OF HARMONIC ARTIFACTS IN HALFTONE SCREENS

BACKGROUND

Halftoning is performed to render continuous tone (contone) digital grayscale and color images into patterns of pixels that can be displayed on bi-level devices such as printers. The rendered images are commonly referred to as halftone images. The pixels of a halftone image are arranged in patterns such that the halftone image is perceived as having continuous tones when viewed through the human visual system (HVS).

One method of halftoning involves the use of dither matrices, also known as halftone screens. A halftone screen includes a two-dimensional array of thresholds. Each threshold is a number having a value v ranging from one to M−1, where M represents the total number of gray levels within the gray scale range being used. If the gray scale range has 256 gray levels, the value v is between one and 255. That is, $1 \leq v \leq 255$.

For standard color dithering, one monochrome screen is used per color separation. In CMYK color space, for instance, a first screen is used for cyan (C), a second screen for magenta (M), a third screen for yellow (Y), and a fourth screen for black (K). Each monochrome screen is applied to a color separation independently of the other screens.

During halftone dithering of a color plane, pixel values in the contone image are compared to thresholds in the halftone screen. If the pixel value in the contone gray scale image pixel has a value larger than or equal to the corresponding threshold, a dot is formed in the corresponding position of the halftone image (assuming an ascending gray level numbering convention is employed, i.e., where higher gray level numbers correspond to darker gray levels). Decisions to place dots are made on a pixel-by-pixel basis.

The halftone images may contain halftone patterns composed of isolated pixels. However, isolated pixels are not reliably reproduced by laser printers, digital printing presses, and other electro-photographic systems.

The halftone images may contain clusters of pixels. The pattern power spectra of the clustered pixels exhibits a strong mid-frequency component, as opposed to the strong high frequency component exhibited by the isolated pixel halftone patterns. Cluster dot screens produce dot clusters, which can be reliably reproduced by electro-photographic devices.

The halftone images can contain harmonic artifacts that appear as parallel lines that are equally spaced apart. The parallel lines might be rotated at an angle. These artifacts can degrade image quality.

It is desirable to reduce the visibility of these harmonic artifacts in halftone images.

SUMMARY

According to one aspect of the present invention, a halftone screen is modified. Artifacts are modeled from the screen in a frequency domain; and threshold values in the screen are modified to reduce amplitude of at least some of the modeled artifacts.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 4 is an illustration of weights for one color separation with respect to another color separation.

FIG. 7 is an illustration of a general method of designing a halftone screen in accordance with an embodiment of the present invention.

DETAILED DESCRIPTION

Figure 1:
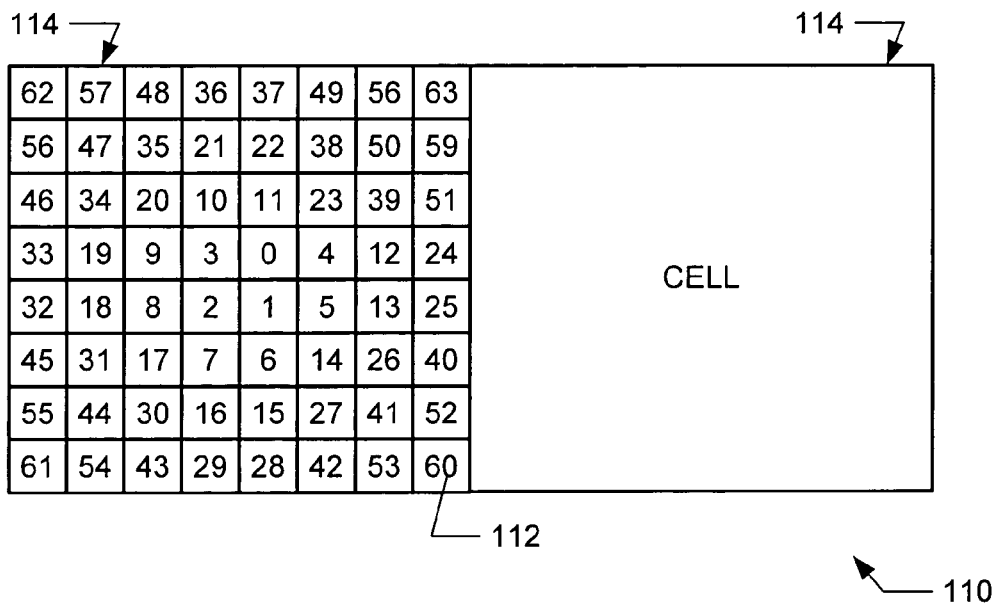
FIG. 1 is an illustration of an exemplary halftone screen.

As shown in the drawings for purposes of illustration, the present invention is embodied in methods of reducing harmonic artifacts in halftone images produced by one or more halftone screens. The screens, which are considered sources of harmonic artifacts, are modified to reduce the harmonic artifacts.

A method according to the present invention is not limited to any particular type of halftone screen. However, the method is especially useful for irregular dot cluster screens. A method according to the present invention is not limited to any particular type of print engine. However, the method is especially useful for print engines that have harmonic interference sources (e.g., digital print engines with multiple laser beams).

Reference is made to FIG. 1, which illustrates an exemplary cluster halftone screen 110. The halftone screen 110 includes a two-dimensional array of thresholds 112. Each threshold 112 is a number having a value v ranging from one to M−1, where M represents the total number of gray levels within the gray scale range being used. For example, if the range has 256 gray levels, the value v is $1 \leq v \leq 255$.

The thresholds are arranged in cells 114. Each cell 114 determines how its cluster is grown.

The halftone screen 110 is used to generate a halftone image from a contone image. Since the halftone screen 110 is typically smaller than the contone image, the halftone screen 110 may be tiled or replicated across a color plane of the contone color image.

The halftone screen illustrated FIG. 1 is considered a "regular" screen. This regular screen will be used to describe the methods according to the present invention. However, the methods according to the present invention are not limited to regular cluster halftone screens. For instance, the methods according to the present invention can be used to modify irregular cluster halftone screens.

Figure 2:
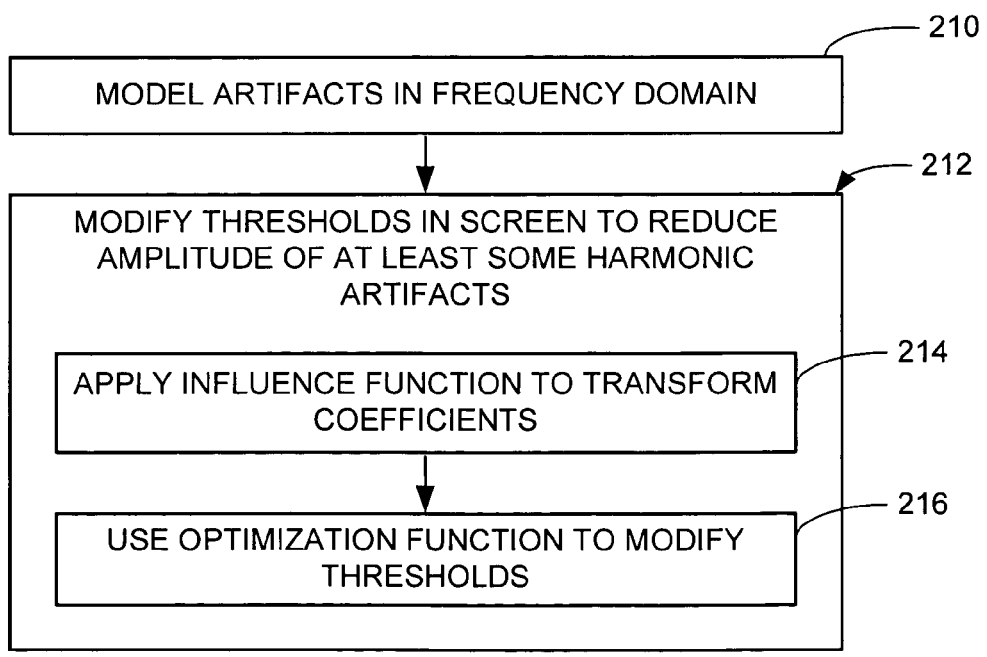
FIG. 2 is an illustration of a general method of modifying a halftone screen in accordance with an embodiment of the present invention.

Reference is made to FIG. 2, which illustrates a general method of modifying a halftone screen. Artifacts from the screen are modeled in a frequency domain (210). The artifacts may be modeled by applying the screen to different contone input images, and performing a Discrete Fourier Transform (DFT) on the resulting halftone images. Each contone input image has only one tone level, and the different contone input images have different tone levels.

Alternatives to the DFT include the Discrete Cosine Transform (DCT) and the Discrete Sine Transform (DST). Other transforms which generate frequency content may be used.

Each halftone image is transformed into an image having transform coefficients. The transform provides an indication of artifacts that are expected to appear in an image rendered at a given tone level. The DFT identifies the artifact magnitude for each frequency. Higher amplitudes correlate to more significant artifacts.

The screen may be modified without considering the influence of other color separations, or it may be modified with respect to screens for other color separations. The other screens, in combination with the primary screen, can cause harmonic artifacts at "beat frequencies." For example, a black screen may be modified with respect to cyan and magenta screens. Thus the method can reduce harmonics due to beat frequencies as well as harmonic artifacts caused solely by the primary screen.

The method can also be used to reduce harmonic artifacts caused by other sources. In a digital printing press, for instance, harmonic artifacts can arise from a laser write head system of the press.

The threshold values in the screen are modified to reduce amplitude of at least some of the modeled artifacts (212). The threshold values of the screen 110 may be modified to migrate harmonic content from perceptible frequencies to imperceptible or less perceptible frequencies.

Modification of the thresholds may include applying an influence function to coefficients of the transform (214). The influence function, which corresponds to the human visual system, determines which frequencies are more perceptible. To a very rough approximation as a linear spatially-invariant system, the human visual system is lowpass. With respect to noise in still images, the human visual system is in general less sensitive to uncorrelated high-frequency noise than uncorrelated low-frequency noise. Frequencies closer to the DC (zero frequency) have a greater impact on the human visual system. In addition, artifacts closer to 0 and 90 degrees have greater impact on the human visual system then artifacts on a diagonal. All the different frequencies in a given screen per each tone level are weighted. The influence function has a larger weight for transform coefficients around DC than for transform coefficients around other screen harmonics.

An optimization function may be used to modify the threshold values (216). A goal of the optimization function is to shift the amplitude from perceptible artifacts to non-perceptible artifacts. Thus, perceptible artifacts are diminished, and imperceptible artifacts are enhanced.

One advantage of this method is that halftone screens may be modified off-line. Another advantage of the method is that halftone screens need be modified only once.

Figure 3:
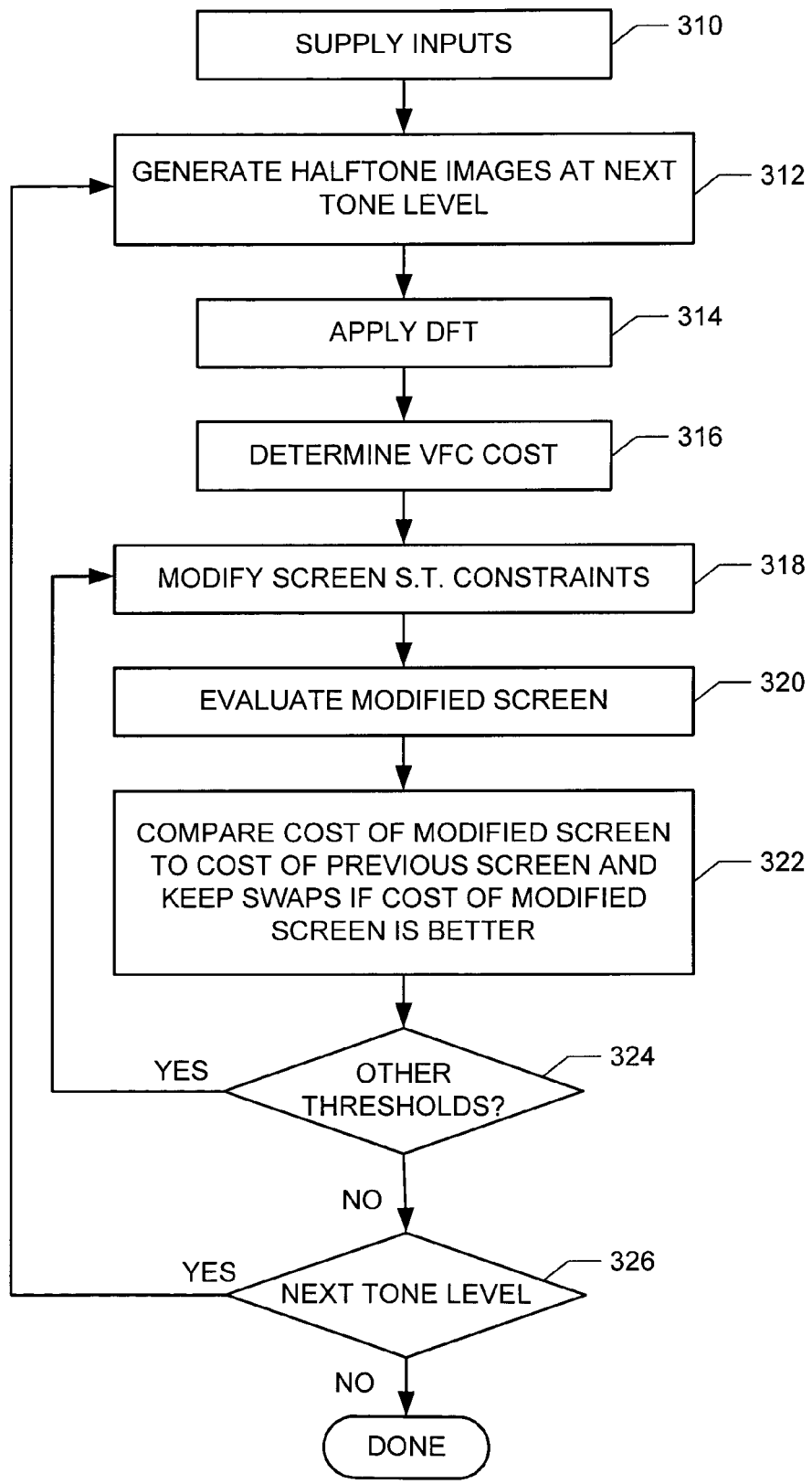
FIG. 3 is an illustration of a more specific method of modifying a halftone screen in accordance with an embodiment of the present invention.

Reference is now made to FIG. 3, which illustrates a specific method of modifying a halftone screen. A series of inputs are provided to a computer (310). The inputs include screens for different color separations, an HVS weight matrix, geometrical constraints on the shape of a single cluster, and contone input images having tone levels in the range [a, b]. One of the screens will be referred to as the primary screen. The other screens will be referred to as secondary screens. In the method of FIG. 3, the primary screen will be evaluated as a single separation or alternatively with respect to one or more of the secondary screens. The HVS weight matrix may have the same size as the primary screen, with weights for every possible frequency. The geometrical constraints prevent the dot cluster growth from being modified in certain ways. For example, the geometrical constraints might prevent isolation of dots or an otherwise reduction in connectivity, or cells that are too acute, or holes within dot clusters.

The computer generates a set of halftone images at a first tone level (312). The primary screen is applied to the input image having the first tone level.

A DFT is applied to the halftone images (314), visual frequency content (VFC) cost of the primary screen (i.e., a scalar which corresponds to visual artifacts level) is determined (316). The VFC cost of the primary screen (s) at a specific threshold (c) may be defined as $$COST_{VFC}(s,c) = \|abs(DFT(s \leq c)) * HVS\|$$

where s is a threshold matrix, and c is a scalar corresponding to tone level, HVS represents an influence function, operator * represents a scalar multiplication of matrices (i.e., element by element). The condition s>c compares elements of the threshold matrix (s) with the scalar (c) to produce a binary matrix with '1' were the condition is met, and '0' elsewhere; abs- is the absolute operator (amplitudes of the DFT corresponds to strength for a specific frequency); and $\|.\|$ is a cost function of the VFC. For example, a cost function such as an L2 norm (i.e., the sum of squared weighted transform amplitudes, excluding the DC) may be applied to the weighted transform coefficients. In the alternative, an L_infinity norm (i.e., the largest weighted transform amplitude, excluding the DC) may be used.

The effect of the secondary screens on the pattern may be modeled by performing a convolution of the primary screen and the secondary screens. However, the convolution results in an extremely large number of frequencies. Even for two screens, assuming there are T tones per screen, there are $T^2$ convolution combinations.

Convolution is performed as the sum of all the multiplications of individual frequencies (one from each of the two screens). However, instead of performing convolution and focusing on all frequencies, focus can be placed on (1) frequency pairs which sum up to a low frequency (relative to the HVS weight); and (2) frequency pairs which are dominant (multiplied amplitudes).

Therefore, multi-separation artifacts may be modeled as follows:
1. Focus only on dominant frequencies in each of the secondary screens. Usually these will be the first and possibly the second cell frequencies of the respective screens. In the alternative, these dominant frequencies could be determined by applying secondary screens to different inputs having different tone levels, and performing a DFT on the resulting halftones.
2. Locate the frequency domain region of these frequencies in the primary screen. Note that any of the frequencies in that region might combine with at least one of the dominant frequencies of the secondary screens to produce a low frequency artifact.
3. Ensure that there is no (or at most very low) frequency content in the frequency domain regions of the primary screen as described above.

Figure 4A:
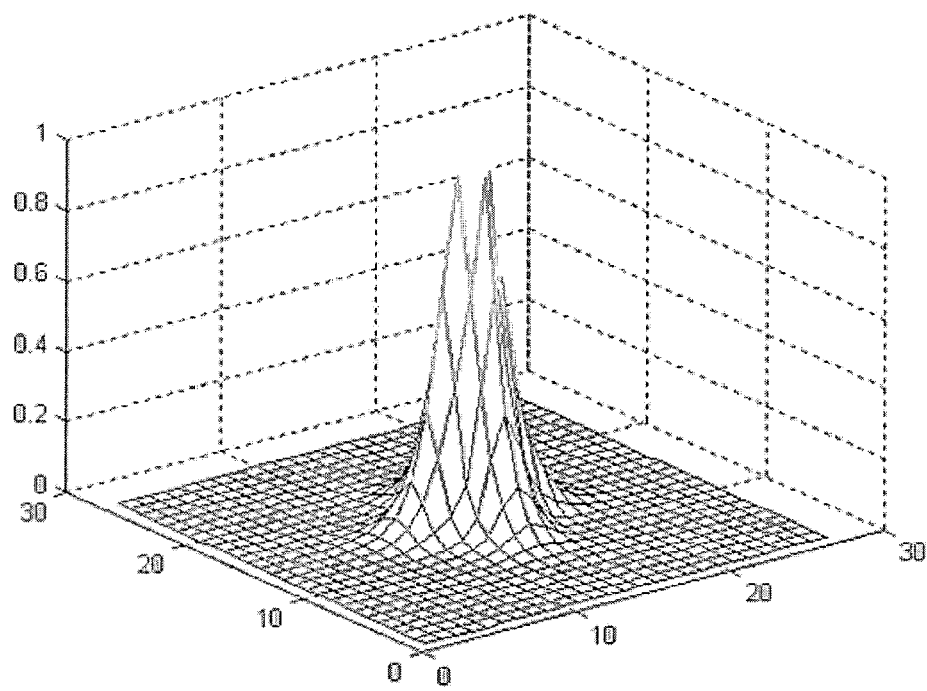
FIG. 4a is an illustration of influence function decay according to an embodiment of the present invention.

Thus instead of multiplying the DFT of a primary screen with typical HVS weights, the DFT is multiplied with an HVS centered at the DC (for single-separation artifacts), and other HVS weight functions centered on interfering frequencies (cell frequencies of the other separations). An example of the weights corresponding to a black separation with additional weights for the first harmonics of the corresponding cyan and magenta screens are illustrated in FIG. 4. HVS functions centered on a central (DC) frequency 410 and eight surrounding frequencies 412 are illustrated schematically. The horizontal and vertical axes are the spatial frequencies, the DC (410) is the (0,0) frequency. The surrounding frequencies may be considered as two overlapping grids, one at about a 20 degree angle, and the other at abut an 85 degree angle. The grids represent the harmonics caused by the secondary screens. The influence function gives higher weights (and therefore, greater visual impact) to the DC frequency region than the region corresponding to interfering frequencies. A 3:1 ratio in favor of the DC influence function may be used. In addition the influence function may decay slower around the DC than around the interfering frequencies. Exemplary decay around the DC frequency is illustrated in FIG. 4a.

The screen is modified by performing threshold swapping (318). A threshold of the current tone is swapped with a larger threshold. Different types of threshold swapping include Intracell threshold swapping and Intercell threshold swapping. The threshold swapping modifies the way in which dot clusters are grown.

As the screen is modified, geometric constraints are examined. A swap is disallowed if a constraint is not satisfied. For example, a swap might be disallowed if it causes dots to be isolated or otherwise reduces connectivity, or makes the cells too acute, or creates holes within dot clusters.

The modified screen is evaluated (320). The modified screen may be evaluated by performing steps 314 and 316 on the modified screen.

The VFC of the modified screen is compared to the VFC of the previous screen (322). If the swaps reduce the VFC of the original screen, the swaps are kept, in which case the new (lower) VFC is kept as a reference for the VFC of the original screen. Otherwise the swaps are rejected and the original threshold location is restored.

Other possible thresholds of the current tone level are considered (324). Steps 318-322 may be performed on each possible threshold.

Steps 312-324 are repeated for additional tone levels (326), except the modified screen is used to generate the halftone images at 312 and is further modified as steps 314-324. These steps are performed until all tone levels have been processed for each screen. Algorithm re-iteration is likely due to the nature of the implementation, which may not find the global minimum at first iteration.

An example of steps 310-326 will now be provided for the screen of FIG. 1 and a tone level of 4. Applying the screen of FIG. 1 to an image having a tone level of 4 provides the matrix in Table 1. The matrix positions corresponding to thresholds 0, 1, 2, 3 and 4 are "lit up."

TABLE 1

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 1 | 1 | 1 | 0 | 0 |
| 0 | 0 | 0 | 1 | 1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

A DFT is performed on this matrix to get a complex matrix (same dimensions) where the absolute value of each coefficient is the amplitude of the corresponding frequency (and thus its possible appearance strength on the print as an artifact). The absolute DFT matrix is multiplied with a weighting matrix (the HVS) element by element. The HVS is the same size as the DFT, and it weights each frequency by an amount that models how this frequency will appear in the human system. Resulting is a matrix having the same size as the original screen, where every cell has a number corresponding to the amplitude (strength) in which the human system will view the artifact (according to the HVS model).

An L2 norm is applied. The L2 norm is the sum of squared elements of this matrix. Resulting is a scalar measure for artifacts appearance.

The original screen is modified by performing Intracell threshold swapping. Intracell swapping involves swapping of at least one of the thresholds with a larger threshold. For example, a threshold is swapped with one of the n next bigger thresholds. As a result, all clusters remain with the same pixel area for tone level c. Also, for all tones before a, the input and output screens should be identical.

The result of a swap with the location of threshold 6 appears in Table 2.

TABLE 2

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 1 | 1 | 0 | 0 | 0 |
| 0 | 0 | 0 | 1 | 1 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 0 | 0 | 0 | 0 |

For the screen of FIG. 1 and a tone level of 4, reasonable alternatives for swapping (all pixels which are connected by an edge to the lit pixels) are the pixels with thresholds 5-11. Thus all of these thresholds are candidates for swapping. A cost function may be computed for each candidate, and the swap having the lowest cost function may be used.

Intercell swapping may be used instead of Intracell swapping. Consider a screen that holds many small cells, where each cell holds only a subset of the thresholds (e.g., 16 out of the 256 or 700 possible threshold values), and the thresholds in the subsets are non-overlapping (i.e., thresholds in one subset are different than the thresholds in another subset). For such a screen, one may work in a threshold interval in which there is only one threshold location per cell. In this interval, thresholds between cells can be swapped without changing the geometry of any cell. If two threshold values in the same interval but in different cells are swapped, neither of the cells assumes a new shape. The original cell shapes are simply applied in a different tone for the different cells.

Figure 5:
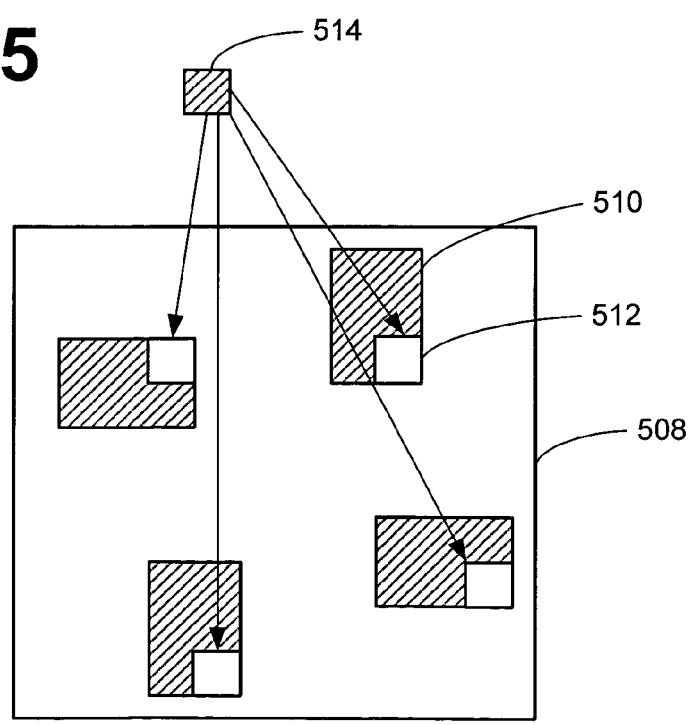
FIG. 5 is an illustration of intercell threshold swapping.

Reference is made to FIG. 5, which illustrates swaps between clusters 510 in a screen 508. Several clusters 510 are illustrated, with their next "candidate pixels 512 to be lit" represented by white-filled boxes (a lit pixel may be regarded as a darkened or colored pixel, or a pixel upon which ink is deposited). Each cell (not shown) of the screen 508 contains a single cluster 510. The next threshold 514 that should be allocated is represented by a cross-hatched box. Cluster pixels that were previously lit are also represented by cross-hatching. An Intercell algorithm allocates the threshold 514 to one of the candidate pixels 512 (which then becomes lit). All pixels within the interval are taken as a bulk. That is, assume that all candidate pixels 512 to be lit have thresholds within the interval, and that the final threshold of each pixel 512 will be set by the Intercell algorithm. The Intercell algorithm re-arranges the order in which the candidate pixels 512 are lit. If the tone interval is large enough, Intracell swaps may occur.

The following Intercell algorithm may be used to determine the best order for this to happen. If a screen contains k thresholds of each of the tone values in the interval [t, t+1], then k out of the 2 k locations will be allocated to threshold t, such that the new pattern (at threshold t) has minimal artifact level (VFC). The other k locations are allocated to threshold t+1. As long as Intracell swap intervals do not occur, the new lit pixels simply appear in a different order, and the clusters do not change. One advantage of this Intercell algorithm is that thresholds outside the interval are not modified.

A screen may be modified by using Intracell swapping in combination with Intercell swapping. Intercell swaps may be used for non-overlapping intervals between minima of the artifact model. This works well as long as the minima are close enough so that there is no more than a single threshold per cell in the tone range. For mid-tones, two or three thresholds per cell per interval may be used. Intracell swaps may be used in small intervals to create minima between the Intercell swaps may be applied. Tone intervals are allowed to overlap and the resulting cell shapes are restricted. The resulting cell shapes may be restricted by the same geometric rules that are used for Intracell swaps.

The halftone screen is not limited to any particular color planes. In color printers, for example, the illusion of continuous shades of color is produced by superimposing the halftones of the individual colorants used, e.g., cyan, magenta, yellow and black (CYMK).

All screens may be modified. In the alternative, only the black screen may be modified with respect to cyan and magenta.

Modification of the screens is not limited to swapping. Intercell swapping, for instance, is performed to set the number of pixels of a specific threshold to be different from the original screen, so long as the total number of pixels in the threshold interval is the same as in the original. For example, suppose an original screen has a total number of pixels within the working interval of 1000. Suppose also that the number of thresholds within the interval is ten, and that each threshold contains 100 pixels. It is now possible to set the number pixel per threshold to be different, for example, by setting the first five thresholds of the modified screen to contain 150 pixels, and the last five thresholds to contain fifty pixels. The total number of pixels within the threshold interval in the modified screen remains 1000, as in the original screen.

The halftone screen is not always the only source of harmonic artifacts. Harmonic artifacts can also come from the print engine that uses the screen.

Consider a digital printing press. The digital printing press includes a laser writing head system. The writing head contains multiple laser beams. Because of possible inconsistence of the laser beams, harmonics might be generated (e.g., the basic period is twelve for a writing head having twelve laser beams). The laser harmonies may interact with the screen harmonies to produce artifacts. Specifically, if a sum of two frequencies, one from the primary screen and another from the writing head is a low frequency, the multiplication of the two frequency content values in the corresponding frequency spaces should be very small or zero. If the frequency characteristic of writing head inconsistence cannot be controlled, the corresponding screen frequencies should be low or zero. A writing head with only a single beam, in contrast, would not generate harmonic artifacts.

Figure 6:
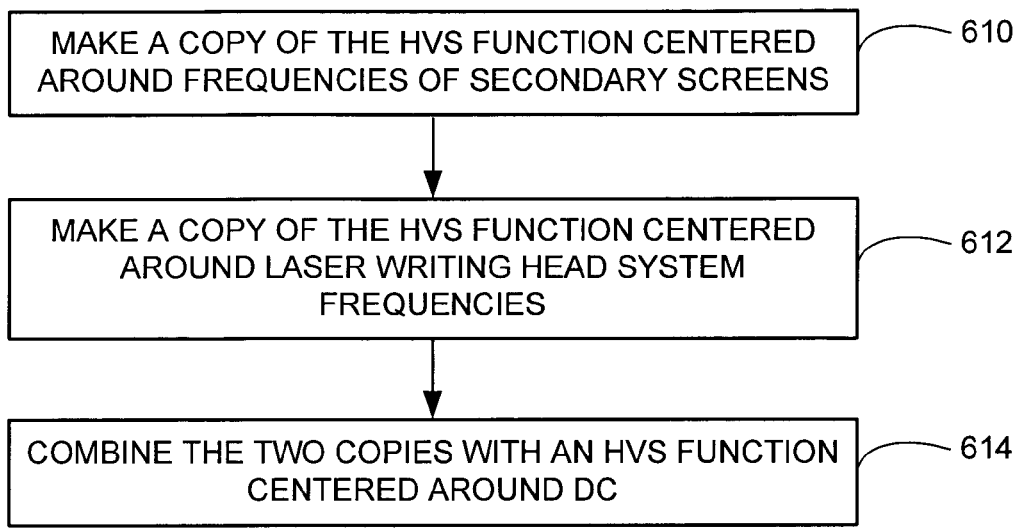
FIG. 6 is an illustration of a method of modifying an influence function in accordance with an embodiment of the present invention.

Referring to FIG. 6, the writing head harmonics, as well as the interfering frequencies from the secondary screens, may be added to the screen model by modifying the influence function. For example, a copy (replication) of the HVS function centered around frequencies of secondary screens is made (610), and a similar copy of the HVS function centered around writing head frequencies is made (612). These two copies are summed or otherwise combined with the HVS function centered about DC (614).

Another source of harmonic artifacts can come from printing substrates used in certain types of printing processes. In lenticular printing, for example, a special substrate is used to create the illusion of 3 D images or to view different images on the same substrate. The substrate includes parallel lenses. The lenses have a viewing angle that encapsulate several pixels, even though an observer views only one pixel at a time. The parallel lenses can generate harmonic artifacts when they interact with the screens. The number of pixels within the viewing angle of a single lens determines the frequency of the interference. Consider a substrate with vertical lenses that view eight pixels per lens. On an 800 dots per inch (dpi) printing press, the interference frequency is 800/8=100 lines per inch (lpi). The direction of the interference in this example is perpendicular to the laser writing head interference. It has been found that the first few harmonics of the substrate should be accounted for (e.g., nine harmonics), and not just the first harmonic.

The methods above are performed on a halftone screen that has already been designed. However, a method according to the present invention is not so limited. Screens may be modified during design.

Reference is made to FIG. 7. Given a screen geometry, cluster geometrical constraints, and the number of pixels for each threshold, the screen may be modified during design instead of after design. A screen geometry is chosen (710). For example, a screen is chosen with a certain orientation and a specific cell size. This gives a grid with multiple central points. A cluster is grown at each central point (712). Conventional constraints are considered (714). The constraints might include shape of the cluster.

Harmonic frequency is also considered as a constraint (716). The harmonic frequency may be considered by applying the method of FIG. 2. The interval includes all thresholds. The method of FIG. 2 indicates where to place the next threshold.

As the clusters grow, the voids between them decrease.

Figure 8:
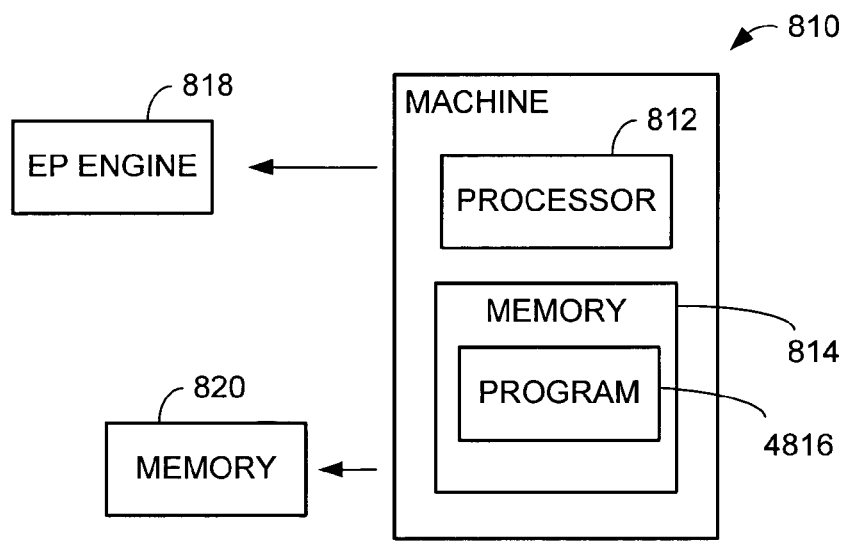
FIG. 8 is an illustration of a system in accordance with an embodiment of the present invention.

Reference is now made to FIG. 8, which illustrates a machine 810 for modifying a halftone screen. The machine 810 includes a processor 812 and memory 814. The memory 814 may include a program 816 for causing the processor to modify the halftone screen according to the present invention.

The modified halftone screen may be distributed in a variety of ways. Once a modified screen is generated, it may be loaded into a digital printing press 818 as part of its software. In other types of electrophotographic print engines 818, the modified screen may be part of a print driver. The print driver or other software can be distributed via a removable medium 820 such as an optical disc (e.g., DVD) or transmitted (e.g., over the Internet) from memory of one machine to another, etc.

Although several specific embodiments of the present invention have been described and illustrated, the present invention is not limited to the specific forms or arrangements of parts so described and illustrated. Instead, the present invention is construed according to the following claims.

The invention claimed is:

1. A method of modifying a dot cluster halftone screen, the method comprising:
    modeling artifacts in a frequency domain, the artifacts modeled from the screen; and
    modifying threshold values in the screen to reduce amplitude of at least some of the modeled artifacts.
2. The method of claim 1, wherein the threshold values are modified to migrate harmonic content from perceptible frequencies to imperceptible or less perceptible frequencies.

3. The method of claim 2, wherein modifying the threshold values includes applying an influence function to the modeled artifacts, the influence function having a larger weight for transform coefficients around DC than for transform coefficients around other harmonics.

4. The method of claim 3, wherein the other harmonics includes other harmonics from the primary screen.

5. The method of claim 3, wherein the other harmonics includes interfering frequencies from secondary screens.

6. The method of claim 5, wherein the influence function centered about the dc frequency has a higher ratio than the influence function centered about any AC frequencies.

7. The method of claim 2, wherein modifying the threshold values further includes using an optimization function to migrate the harmonic content.

8. The method of claim 2, wherein modeling the artifacts includes applying the screen to single-tone input images, and performing a Fourier transform on the resulting halftone images and weighting transform coefficients based on perceptibility of harmonic content; and wherein the threshold modification includes modifying the screen to reduce the perceptible harmonic content.

9. The method of claim 8, wherein the transform coefficients are weighted according to an influence function that corresponds to the Human Visual System.

10. The method of claim 7, wherein a cost function is used to modify the thresholds.

11. The method of claim 1, wherein a DFT is applied to an input image having a first tone level, a first visual frequency content cost of the screen is determined at the first tone level, the screen is modified by performing threshold swapping, the modified screen is applied to the input image, a second visual frequency content cost of the modified screen is determined, the costs are compared, and the modified screen is kept if it the second cost is better than the first cost.

12. The method of claim 1, wherein the threshold values are modified to modify the way in which dot clusters are grown.

13. The method of claim 1, further comprising modeling artifacts caused by screens for additional color separations; wherein the screen is a primary screen that is modified to reduce the amplitude of the modeled artifacts caused by secondary screens for the additional color separations.

14. The method of claim 13, wherein modifying the threshold values includes applying an influence function to the modeled artifacts; and wherein the influence function accounts for harmonics from the additional color separations.

15. The method of claim 13, wherein effects of the secondary screens are modeled by performing convolution of the secondary screens with the primary screen.

16. The method of claim 13, wherein dominant frequencies in each of the secondary screens are considered as interfering frequencies; wherein frequency domain regions of the secondary screen dominant frequencies are located in the primary screen; and wherein transform coefficients of the primary screen are multiplied with an influence function centered on the interfering frequencies.

17. The method of claim 13, wherein a first harmonic in each of the secondary screens is considered as an interfering frequency, frequency domain regions of the interfering frequencies located in the primary screen; and wherein transform coefficients of the primary screen are multiplied with an influence function centered on the interfering frequencies.

18. The method of claim 1, further comprising modeling artifacts due to harmonics from a laser writing head system; wherein the screen is also modified to reduce the amplitude of at least some of the laser writing head system harmonics.

19. The method of claim 18, wherein modifying the threshold values includes applying an influence function to the modeled artifacts; and wherein the influence function accounts for the harmonics from the laser writing head system.

20. The method of claim 1, further comprising modeling artifacts due to harmonics caused by print substrates; wherein the screen is also modified to reduce the amplitude of at least some of the print substrate harmonics.

21. The method of claim 1, wherein modifying the threshold values includes applying an influence function to the modeled artifacts, the influence function corresponding to the human visual system; and wherein the influence function is modified to account for additional harmonic interference.

22. The method of claim 21, wherein modifying the influence function includes replicating a first influence function centered about interfering frequencies, and combining the first influence function with a second influence function centered about DC.

23. The method of claim 22, wherein dominant interference frequencies are chosen as locations for replication.

24. The method of claim 1, wherein modifying the thresholds includes swapping thresholds.

25. The method of claim 24, further comprising evaluating the effect of swaps; and leaving those swaps that reduce amplitude of at least some of the modeled artifacts have been reduced.

26. The method of claim 25, wherein a cost function is used to evaluate the effects of the swap; and wherein the swap is kept if the cost function is reduced by the swap.

27. The method of claim 24, wherein the swaps are subject to constraints.

28. The method of claim 24, wherein modifying the thresholds for each interval involves swapping at least one of the thresholds with a larger threshold; and wherein the swapping and evaluating are repeated at least once for every threshold in the screen.

29. The method of claim 24, wherein Intracell swaps are performed.

30. The method of claim 29, wherein a threshold is swapped with one of the n next bigger thresholds.

31. The method of claim 30, wherein Intercell swaps are performed.

32. The method of claim 1, wherein the screen is modified after having been designed.

33. The method of claim 1, wherein the screen is modified during design.

34. A processor for performing the method of claim 1.

35. An article comprising computer memory encoded with a halftone screen that was modified by the method of claim 1.

36. A digital printing press comprising computer memory encoded with a halftone screen that was modified by the method of claim 1.

37. A digital laser printing device comprising computer memory encoded with a halftone screen that was modified by the method of claim 1.

38. Apparatus comprising
   means for modeling artifacts in a frequency domain, the artifacts modeled from a halftone the screen; and
   means for modifying threshold values in the screen to reduce amplitude of at least some of the modeled artifacts.

39. Apparatus for modifying a halftone screen, the apparatus comprising a processor for modeling artifacts in a frequency domain, the artifacts modeled from the screen, and modifying threshold values in the screen to reduce amplitude of at least some of the modeled artifacts.

40. The apparatus of claim 39, wherein the threshold values are modified to migrate harmonic content from perceptible frequencies to imperceptible or less perceptible frequencies.

41. The apparatus of claim 40, wherein modifying the threshold values includes applying an influence function to the modeled artifacts, the influence function having a larger weight for transform coefficients around DC than for transform coefficients around other screen harmonics.

42. The apparatus of claim 39, wherein modeling the artifacts includes applying the screen to single-tone input images, and performing a Fourier transform on the resulting halftone images; and wherein the threshold modification includes weighting transform coefficients based on perceptible harmonic content, and modifying the screen to reduce the perceptible harmonic content.

43. The apparatus of claim 39, wherein a DFT is applied to an input image having a first tone level, visual frequency content cost of the screen is determined at the first tone level, the screen is modified by performing threshold swapping, the modified screen is applied to the input image, a second visual frequency content cost of the modified screen is determined, the costs are compared, and the modified screen is kept if it the second cost is better than the first cost.

44. The apparatus of claim 39, wherein the processor also models artifacts caused by secondary screens.

45. The apparatus of claim 44, wherein dominant frequencies in each of the secondary screens are considered as interfering frequencies; frequency domain regions of the dominant frequencies located in the primary screen; and wherein transform coefficients of the primary screen are multiplied with an influence function centered on the interfering frequencies.

46. The apparatus of claim 44, wherein a first harmonic in each of the secondary screens is considered as an interfering frequency, frequency domain regions of the interfering frequencies located in the primary screen; and wherein transform coefficients of the primary screen are multiplied with an influence function centered on the interfering frequencies.

47. The apparatus of claim 39, wherein the processor also models artifacts arising from harmonics from laser writing head system harmonics; wherein the screen is also modified to reduce the amplitude of at least some of the laser writing head system harmonics.

48. The apparatus of claim 39, wherein modifying the threshold values includes applying an influence function to the modeled artifacts, the influence function corresponding to the human visual system; the influence function having been modified to account for additional harmonic interference.

49. The method of claim 48, wherein the modified influence function includes a replica of a first influence function centered about interfering frequencies combined with a second influence function centered about DC.

50. The apparatus of claim 39, wherein modifying the thresholds includes swapping thresholds.

51. The apparatus of claim 50, wherein the processor performs Intracell swaps.

52. The apparatus of claim 50, wherein the processor performs Intercell swaps.

53. An article for a processor, the article comprising memory encoded with data for causing the processor to model artifacts in a halftone screen, and modify the halftone screen to reduce the artifacts, the artifacts modeled in a frequency domain, the artifacts modeled from the screen.

* * * * *

UNITED STATES PATENT AND TRADEMARK OFFICE
CERTIFICATE OF CORRECTION

| | | |
|---|---|---|
| PATENT NO. | : 8,345,311 B2 | Page 1 of 1 |
| APPLICATION NO. | : 10/844993 | |
| DATED | : January 1, 2013 | |
| INVENTOR(S) | : Mani Fischer et al. | |

It is certified that error appears in the above-identified patent and that said Letters Patent is hereby corrected as shown below:

In the Claims:

In column 9, line 34, in Claim 11, after "if" delete "it".

In column 11, line 23, in Claim 43, after "if" delete "it".

In column 12, line 17, in Claim 49, delete "method" and insert -- apparatus --, therefor.

Signed and Sealed this
Sixteenth Day of April, 2013

Teresa Stanek Rea
*Acting Director of the United States Patent and Trademark Office*